(12) United States Patent
Karam et al.

(10) Patent No.: US 9,078,065 B2
(45) Date of Patent: Jul. 7, 2015

(54) SYSTEM AND METHOD FOR DISPLAYING SOUND AS VIBRATIONS

(75) Inventors: Maria Karam, Toronto (CA); Deborah I. Fels, Toronto (CA); Frank A. Russo, Toronto (CA)

(73) Assignee: Maria Karam, Toronto (CA)

( * ) Notice: Subject to any disclaimer, the term of this patent is extended or adjusted under 35 U.S.C. 154(b) by 828 days.

(21) Appl. No.: 12/788,056

(22) Filed: May 26, 2010

(65) Prior Publication Data

US 2011/0129093 A1  Jun. 2, 2011

Related U.S. Application Data

(60) Provisional application No. 61/181,548, filed on May 27, 2009.

(51) Int. Cl.
| | |
|---|---|
| *H04R 5/00* | (2006.01) |
| *H04R 3/12* | (2006.01) |
| *G09B 21/04* | (2006.01) |
| *H04R 1/02* | (2006.01) |
| *H04R 1/24* | (2006.01) |
| *H04R 9/06* | (2006.01) |

(52) U.S. Cl.
CPC *H04R 3/12* (2013.01); *H04R 1/028* (2013.01); *H04R 1/24* (2013.01); *H04R 9/063* (2013.01); *H04R 2201/023* (2013.01); *H04R 2400/03* (2013.01); *H04R 2499/15* (2013.01); *G09B 21/04* (2013.01)

(58) Field of Classification Search
CPC .......... H04R 5/023; H04R 1/028; H04R 1/24; H04R 2201/023; H04R 2400/03; H04R 2499/15; H04R 3/12; H04R 9/063
USPC .................. 381/333, 388, 151, 124, 301, 18; 84/620, 632, 630, 454, 456; 297/217.3, 297/217.4; 601/49, 57, 70, 47, 149
See application file for complete search history.

(56) References Cited

U.S. PATENT DOCUMENTS

| | | | | |
|---|---|---|---|---|
| 4,023,566 | A | * | 5/1977 | Martinmaas ................ 601/47 |
| 5,113,852 | A | * | 5/1992 | Murtonen .................... 601/47 |
| 5,314,403 | A | * | 5/1994 | Shaw ........................ 601/148 |
| 5,669,818 | A | * | 9/1997 | Thorner et al. ............. 463/30 |
| 5,857,986 | A | * | 1/1999 | Moriyasu .................... 601/49 |
| 2011/0228962 | A1 | * | 9/2011 | Taylor et al. ............... 381/322 |

* cited by examiner

*Primary Examiner* — Lun-See Lao
(74) *Attorney, Agent, or Firm* — Gowling Lafleur Henderson LLP (57) ABSTRACT

There is provided a method and a system for presenting audio signals as vibrotactile stimuli to the body in accordance with a Model Human Cochlea (MHC). Audio signals are obtained for presentation. The audio signals are separated into multiple bands of discrete frequency ranges that encompass the complete audio signal. Those signals are output to multiple vibrotactile devices. The vibrotactile devices may be positioned in a respective housing to intensify and constrain a vibrational energy from the vibrotactile devices. Output of the vibrotactile devices stimulate the cutaneous receptors of the skin at the locations where the vibrotactile devices are placed. In one embodiment, a system implements this method using audio voice coils that are embedded in a chair, which make contact with the human body while seated.

30 Claims, 4 Drawing Sheets

SYSTEM AND METHOD FOR DISPLAYING SOUND AS VIBRATIONS

CROSS REFERENCE

This application claims the benefit of U.S. Provisional Application No. 61/181,548, filed May 27, 2009, which is incorporated herein by reference.

FIELD

The present matter relates generally to the domain of audio-tactile displays that translate audio information as a tactile display that can make audio information more universally accessible by providing an alternative sensory modality to represent sound information to people including those who are deaf or hard of hearing.

BACKGROUND

One of the fast growing development areas in human-computer interaction involves the transformation of stimuli across modalities. These crossmodal displays provide information from one sensory modality, such as vision, using the display of a different modality, such as sound. Effective design of crossmodal displays necessitates the determination of a method for translating, interpreting, or otherwise mapping signals of an input modality onto properties of an alternative display. This mapping is commonly referred to as sensory substitution. Sensory substitution techniques can be designed to support the crossing of any two sensory modalities. But the success of this class of displays is highly dependent on the parameters and their mapping across the modalities. Much of the research in crossmodal displays focuses on the translation of audio or visual information onto the somatosensory (touch) receptors using tactile devices. One existing example is pin arrays—a series of blunt tipped pins arranged in a grid formation to produce vibrations or other motions that present the image in its tactile representation. Pin arrays employ sensory substitution techniques to map low resolution pixels from an image onto the sensations of a tactile display, and are typically used to support blind users in interpreting image information as touch [1, 2]. A second example is where music is transformed into visualizations by interpreting musical properties such as chords and pitch onto visual properties such as colour and shape [3].

SUMMARY

This application discloses a sensory substitution method and system (e.g. embodied in a physical form factor) that can support users in experiencing sound information as tactile vibrations. A series of audio transducers such as voice coils, speakers, or other devices that can vibrate within the range of the audio frequency spectrum are used as vibrotactile devices to represent tactile channels that produce physical vibrations resulting directly from the audio signal. Each of the channels represents the signal that is presented to the vibrotactile devices. Each vibrotactile device presents information from one or more channels. The channels are determined by the frequency signal that is displayed through them. Channels are designed to best represent the concepts being expressed through the sound, while optimizing the detection of those channels by the body. Audio spectrum analysis or other methods for sound analysis can be applied to determining the frequency ranges of each channel in relation to the entire system. The physical arrangement of the vibrotactile devices may also be designed to optimize the skin's ability to detect a range of frequencies using psychophysical research and methods. The vibrotactile devices may be positioned in a respective housing to intensify and constrain a vibrational energy from the vibrotactile devices. This arrangement of audio signal, as distributed to different areas on the skin has been shown to be effective in increasing emotional expressiveness of the sound for the tactile senses. Vibrotactile devices that effectively create audio-tactile vibrations may be voice coils, which are commonly found in loudspeakers and rely on the electromagnetic component for providing the motive force to the speaker cone. Voice coils are highly responsive to both amplitude and frequency characteristics of the sound signal, while powerful enough to create and maintain physical vibrations. Tuning and placement of the voice coils may be determined by the Model Human Cochlea, a theoretical framework that provides a mathematical and algorithmic definition of the sound to vibrotactile translation and the method of implementing it in hardware, software, and in the human interface. We have conducted several studies into this technology, which demonstrate that sound vibrations are very emotionally expressive and that the separation of audio signals onto multiple vibrotactile channels reveals more of the music to the tactile senses than what is possible using a pure audio signal intended only for listening.

BRIEF DESCRIPTION OF THE DRAWINGS

The present matter may be further understood by reference to following description in conjunction with the appended drawings in which.

In the following description like numerals refer to like structures and processes in the diagrams.

DETAILED DESCRIPTION

This subject matter is directed to a crossmodal audio-tactile display, referenced herein as the Model Human Cochlea (MHC). There is described below particular combinations of hardware, software, sensory substitution techniques, and interaction elements useful to support direct translation of an audio source as vibration via discrete frequency components. The method and system are intended to support the experience of 'feeling the music'.

An audio signal presented over a loudspeaker can be experienced by a listener, such as a human listener, as tactile vibration by the human making physical contact with the cabinet. However, only a portion of the signal may be detected in this way. The portion of the signal that is available tends to be relatively low on the frequency spectrum. The basis for this low-frequency bias is found in the signal and the human body: first, the long-term average spectrum in speech and music signals peaks in the low-frequency range (see for example [4]) and second, the human body's cutaneous system has enhanced sensitivity to low-frequency vibration [5].

The MHC addresses this problem by separating the vibrations into discrete frequency components or channels, and presenting them as separate points of vibration on the user's body, in particular, the user's skin. In the same way that the inner hair cells of the human cochlea are tuned to specific frequencies, the MHC tunes specific vibrotactile devices to discrete frequency components or bands of the audio signal. By physically separating these devices along the surface of the skin, each channel can make contact with independent groups of mechanoreceptors. This enables a user to gain access to additional information from the sound based on receiving discrete tactile stimulation from a minimum of four separate channels of the sound, rather than receiving only from a single speaker or channel.

The system contributes to the information and entertainment experience by providing a different modality with which to experience emotionally expressive audio, including music and speech.

The use of audio signals as vibrotactile stimuli is common for deaf and deaf-blind people: The Tadoma method is used to assist deaf-blind people when lip reading, where fingers are placed on the lips and throat of a speaking person to detect the vibrations of the vocal chords and lips. Audio speakers also enable deaf people to feel some of the stronger elements of music when the volume is high, enabling the rhythm, bass and percussion portions of the signal to be detected as physical vibrations.

While there are numerous examples of systems that present audio signals using tactile displays, the MHC differs primarily in its treatment of the audio source. By attempting to design the tactile display to emulate the way the human hearing organ processes sound, we have developed a theory of sensory substitution for translating sound into physical stimuli that draws on the similarities between both senses.

Unlike existing approaches, which present an entire audio signal to a single tactile device, the MHC enables the detection and display of a wider range of audible frequencies by separating the sound into discrete frequency bands or channels that are presented on separate areas on the skin.

Several direct comparisons can be made between the MHC and the human cochlea. First, the body's cutaneous mechanoreceptors are functionally similar to the hairs cells (mechanoreceptors) of the cochlea. When a travelling wave passes through the ear, the specific hair cells that are tuned to detect this wave bend, and thus stimulating its location along the basilar membrane, which alters the electrical current in the auditory nerve. This electrical current travels along the auditory nerve and to the auditory cortex via the thalamus. Because specific hair cells along the basilar membrane are tuned to different frequencies, there is a correspondence between the place of stimulation and the input frequency—a place code. The frequency of stimulation, which corresponds to the rate of firing of the auditory nerve is also locked to the repetition rate of the input frequency—a time code. Similarly, the mechanoreceptors in the skin also respond to pressure and vibrations from an external stimulus. The location on the basilar membrane where a specific hair cell is situated is referred to as the place code. This place code is thus recreated using the vibrotactile channels of the MHC, which present specific frequency ranges to discrete sets of mechanoreceptors on the skin, albeit a much narrower range of frequencies. When a channel stimulates the mechanoreceptors on the skin, this sets off an electrical potential that travels along the afferent nerve to the somatosensory cortex via the thalamus.

The basilar membrane and associated hairs in the human cochlea detect the different frequencies for which they are tuned, while the MHC uses vibrotactile devices to stimulate the mechanoreceptors on the skin, which is analogous to the place code theory. Thus, each channel of the MHC presents a different set of signals on each part of the skin where vibrotactile devices are located. The time code of the audio signal is also available to the cutaneous system provided that the repetition rate (fundamental frequency) of the signal falls within the vibrotactile range (e.g., 5-2000 Hz)

To summarize the analogy, when the audio signal is presented to the skin as specific points of vibration using vibrotactile devices such as voice coils, this stimulates the cutaneous receptors, which sends electric potentials to the central nervous system for further processing.

To validate this approach, a study was carried out to determine the enjoyment levels and the ability of users to detect emotions expressed through music using the MHC configured with frequency separation (FM) and a track separation (TM) and applied to the user's skin on the back using a four channel configuration of voice coils. These were compared with a control condition (CM) of applying the music output in a standard configuration (two voice coils applied to the skin). Twelve participants rated their assessment of the emotion of the stimuli (sad, happy) presented to them and their enjoyment levels on 7-point Likert scales. Observations, notes and any comments provided by participants were also collected and comprised part of the data set.

A 2×3 fully factorial design was used (two emotions, three vibrotactile models) with the order of presentation of each model randomized between participants. Statistical analyses (MANOVA, ANOVA, Tukey post hoc, and chi-square) were used to assess the data.

Results from the MANOVA, chi-square, and post-hoc analyses suggest that the TM more effectively represents emotional characteristics of happy and sad songs as vibrations than either the FM or CM. Although these results were based on data that did not satisfy the assumption of equal variances, the interaction effect between model type and song was significant. Chi-square tests showed a significant effect when the models were assessed in combination with the songs. Post hoc and chi-square analyses suggest that the FM model did not differ significantly from the TM for emotional expressiveness. In addition, observations of the data for emotion ratings suggest that the FM was more effective at representing emotion than the CM.

Qualitative results revealed that the slower, low frequency vibrations presented to the lower part of the body were associated with sad elements, while the faster high frequency vibrations presented to the upper part of the body were more likely to be interpreted as representing happy elements. This research also suggested that it is not only possible to express emotional information through vibrations, but user feedback from the study suggested that the MHC could potentially invoke genuine emotional responses in participants.

The framework that the MHC presents describes the configuration and integration of the hardware, software, sensory substitution techniques, and interaction elements of the implemented system.

Audio Source

Audio signals that are presented as vibrotactile stimuli by the MHC may originate from one or more sources including digital or analog signals. The sources may be previously recorded sounds or live recordings (i.e. signals acquired during a live performance that are provided substantially contemporaneously to the MHC). The signals may represent sounds of instruments, voices, environmental noises, or any combination of the forgoing.

Hardware and Software

In accordance with various described embodiments, MHC hardware may comprise an audio signal source which may comprise one or more devices used to create, record, convert, or otherwise acquire an audio signal to be presented by the MHC, a computer or other processing device used to manipulate the audio signal, four or more vibrotactile devices including but not limited to voice coils, and related audio equipment that supports the acquisition, manipulation, and presentation of the audio signal, including power supplies, cables and connectors.

In accordance with various described embodiments, MHC software may comprise computer algorithms used to create, record, convert or otherwise process an audio signal and deliver that signal to the MHC hardware. It may also comprise a human-computer interface that allows human users or operators to control and configure the various aspects of the MHC system such as intensity of the vibrotactile devices, the distribution of audio signals to the vibrotactile devices and the system parameters such as number, style and location of the vibrotactile devices.

The source audio signal is translated by the software or hardware into vibrotactile stimuli and presented to the human body using four or more vibrotactile devices according to the MHC. Once the audio signal is obtained (e.g. received by the MHC as described below), it can be divided up into a series of separate signals so that different ranges of audio signals can be detected along the skin. An audio signal may be separated based on a sensory substitution model as described further herein below. One sensory substitution model is responsive to frequency ranges. Another sensory substitution model is responsive to different audio tracks of the source signal such as those that may be made available through the instruments, vocals or other sounds. The computer software or hardware separates, if necessary the audio signal (e.g. into discrete packets), which is used to create a series of vibrotactile stimuli that presents the music or audio signal as multiple, discrete tactile sensations. In typical operation and configuration, a single audio signal is received. Once the signal is obtained, it is manipulated into multiple signals and presented as multiple points of vibration. In other embodiments, multiple audio signals can be received and in turn, represented directly on the MHC display as multiple points of vibration.

Sensory Substitution

The way in which the audio signal is divided for display as tactile stimuli represents the sensory substitution component of the MHC in accordance with the model. The audio manipulating software performs the task of separating out the different elements of the audio signal that are intended to be used from the source, or original sources of audio can be directly presented to separate vibrotactile devices.

Vibrotactile Displays

The presentation of audio signals as tactile stimuli is achieved through use of four or more vibrotactile devices. Separate audio signals are directed to each of the vibrotactile devices, or groups thereof as described below, used in an implementation of the MHC, which in turn create the vibrotactile stimuli that represents the audio signals. Vibrotactile devices may include any device that is capable of vibrating at repetition rates found in the audio signal input. Vibrotactile devices may comprise voice coils, transducers, vibration motors, or any other vibrotactile device capable of emitting vibrations within the frequency range of human hearing (e.g., 20 to 20000 Hz).

Most vibrotactile devices are tuned to a particular frequency (i.e., they exhibit a peak frequency response) and thus do not allow for independent control of amplitude and frequency. More specifically, frequency as well as amplitude changes in the signal correspond to intensity changes in the output of the device. The undesirable effect of frequency on intensity depends on distance in frequency from peak. Because some types of vibrotactile devices do not allow for independent control of amplitude and frequency, vibrational devices that incorporate voice coils are preferred. Voice coils generally have a linear frequency response, meaning that amplitude and frequency can be varied independently. Other preferred devices would include any device that allows for independent control of amplitude and frequency of vibration.

Each of the vibrotactile devices that is used to present the audio signal as physical cutaneous stimulation are to be placed in such a way as to support the detection of the vibrations on the body. In some embodiments, these devices may be positioned (e.g. placed) for direct contact with a user's body. In some embodiments, there may be some other layer that will assist with the transmission of audio signals as vibration stimuli to the body. In some embodiments, a combination of direct contact and indirect contact may be employed. This includes fabric, foam, or other materials that can be placed between the vibrotactile devices and the human skin to increase comfort or detectibilty of the signal.

Each vibrotactile device may be placed at a different location on the human body (e.g. including the back, torso, legs, hands, feet, face and arms), to create the vibrotactile sensations. Devices can be secured to the body using straps or fasteners, clothing (e.g. in which they may be embedded), by installing them in or on a chair, table, bench, wall, or other form factor that will support the user in experiencing the physical vibrations resulting from sound, etc.

Each vibrotactile device may be positioned (e.g. encased) in a housing that protects the wiring mechanism from making contact with the human body, and that intensifies and constrains the vibrational energy to the area of the housing. The housing may be made out of rubber, latex, or other material that can distribute the vibrational energy evenly throughout the housing while providing durability against wear and tear on the mechanism. The housing may be fitted into the form factor to increase stability of the component, and to evenly distribute the vibration across the area of the housing (see FIG. 4 described further herein below).

Once fitted, the audio signal can then be sent through the system, producing vibrotactile stimuli that are direct representations of the vibrations that the audio signal would otherwise produce using an audio-only signal.

Interface Components

Vibrotactile devices used in the MHC communicate the vibrations to the different locations on the body by directly making contact with the body, or indirectly, by transmitting the vibrations through an intermediary interface. The intermediary interface can include coverings that encase (in whole or in part) the vibrotactile devices, such as fabric, latex, rubber, neoprene, foam, plastic coverings or coverings that encase the user (in whole or in part) such as clothing. Intermediary interfaces may also include other substances such as water, gel, or oils that can in turn transmit the vibrotactile information from the vibrotactile device to the body.

Figure 1:
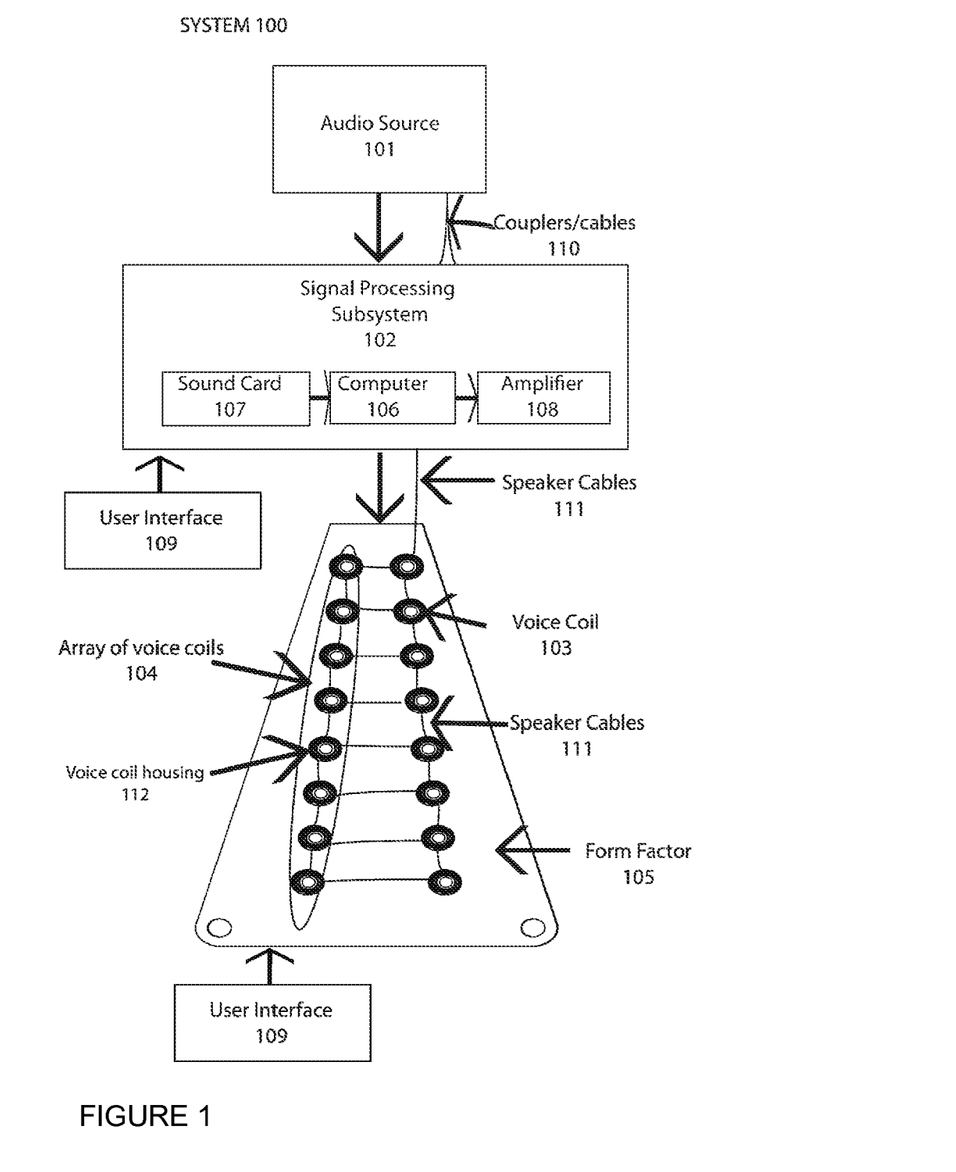
FIG. 1 is a block diagram of the system according to an embodiment using a chair form factor for the vibrotactile display.

FIG. 1 illustrates a representative MHC system 100. The system 100 allows the translation and presentation of audio source signals such as music as a set of vibrations along a body, representing the entire sound source as a tactile display.

System 100 comprises one or more audio sources 101. A signal processing subsystem 102 which supports the conversion of digital audio signals to analog output channels, is coupled to receive audio signals, process the signal into multiple output channels, amplify, then distribute those signals to the voice coils 103, which are arranged in an array 104, within a form factor 105. Subsystem 102 can be comprised of an analogue processing circuit, which can separate frequency signals from audio source 101, and send an amplified signal to each of the voice coils 103 in the array 104. Subsystem 102 may also be comprised of a computing system 106 with a separate audio processing card 107, and amplification system 107, which work in combination to produce the separate frequency signals that are sent to the voice coils 103 in the array 104. In the present embodiment, each voice coil 103 is encased within a housing 112 that is formed to the shape of the voice coil 103, and that connects the array of voice coils 104 and accompanying cabling 111 into the desired structure of the form factor 105. The system 100 can be controlled using an interface 109, which is represented as a software application, or physical control devices to start or stop the system, and to adjust volume and frequency control for the system 100.

In the present embodiment, the audio signal is presented to a digital audio processing card 107, which sends the signal to the computer 106, where a software system processes signals into multiple frequency bands or channels. The signal is redirected back to the digital audio processing card 107, which redirects the signal to the audio amplification system 108, which connects through wired or a wireless system to each of the vibrotactile devices 103 that create the tactile display array 104. In the current embodiment, vibrotactile device 103 is arranged in an array of 16 vibrotactile devices 104 along a chair-cushion form factor 105 to provide the spatio-temporal representation of sound to the body.

Coupling components 110 (e.g. Firewire® connections) may be used to connect the digital audio processing card 107 to the computer 106. However Bluetooth™, FM transmission, or other wireless technology may be used to transmit the signal from an audio source to a receiver that can transfer the signal to the signal processing subsystem. Alternatively, audio signals from 101 can be directly connected to voice coils 103 depending on the embodiment. Speaker wire 111 connects the amplifiers 108 to the voice coils 103. Alternatively, an audio signal 101 can be directly connected to the voice coils 103 depending on the embodiment. Appropriate jacks, RCA connectors, etc. 110 may be used to transfer any audio signal from 101 to subsystem 102, depending on the embodiment. Each component in 102 may be powered according to the requirements of the components used in the embodiment.

In the present embodiment, computing device 106 is a laptop but a person of ordinary skill in the art will appreciate that other forms of computing device may be used including a hardware implementation of band-pass filters for separating the audio sources into the output channels uses a circuit that performs the function of the computer hardware, software, audio signal processing, and signal amplification and does not involve a computing device. In accordance with the present embodiment, components 106, 107, and 108 are illustrated as separate components but one or more of the same may be configured in a single device 102.

In the current embodiment, reference is made to two different models of sensory substitution that separate audio signals into multiple frequency components. These are referred to as the Frequency Model (FM), and the Track Model (FM). Both models support presentation of the audio sources as a vibrotactile display.

The FM can manipulate a single audio source into multiple, discrete frequency bands that are each mapped onto a channel of the vibrotactile display. Single audio sources are the default for use with the FM; however, multiple sources of audio can also be accepted as input if first combined into a single source. Combination of-signals can be achieved in multiple ways. For example, by routing multiple channels to a common track in standard audio-editing software.

In accordance with the FM, the full frequency spectrum of human hearing (typically 20 Hz to 20000 Hz) is separated into discrete frequency bands. The input audio signal is separated into four or more such bands that are used to define four or more respective output signals for respective output channels of the vibrotactile display. Eight or more bands to define respective output channels are preferred.

The TM accepts one or more sources of audio for presentation on the multiple channels of the vibrotactile display. These sources of audio can be live audio tracks from multiple instruments, or track recordings of existing music, which can be directly mapped onto the four or more channels of the vibrotactile display without further processing or separation. If there are more audio sources than there are channels, then two or more of the individual audio sources can be combined.

Figure 2:
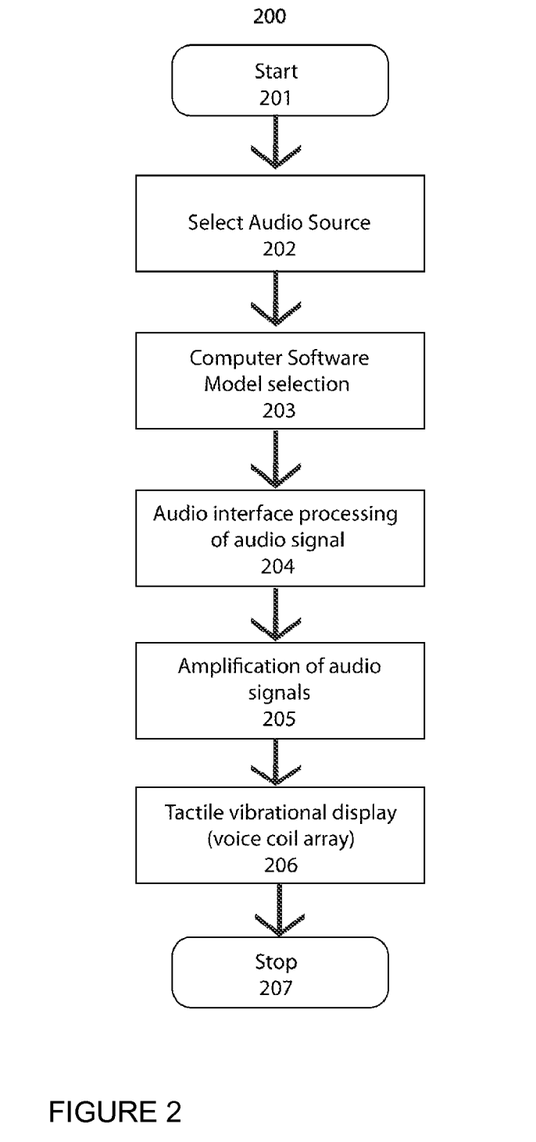
FIG. 2 is a flowchart illustrating the process of conducting sensory substitution of an audio source accordingly to an embodiment of the present matter.

FIG. 2 illustrates a flowchart of operations 200 detailing the embodiment of the MHC involving software manipulation of an audio source. At step 202 selection of the audio source 101 is made. The source 101 may be analog and/or digital, mono or multi-track. At step 203, analog-to-digital conversion occurs (if necessary) and a decision is made regarding the model that will be used to process the digital signal(s). In the event of a mono audio source, the frequency model (FM) is applied to separate the source into component digital signals. In the event of a multi-track audio source, either the frequency (FM) or track model (TM) is applied to separate the source into discrete digital signals (102). At step 204, the component digital signals are converted to discrete analog signals and routed to separate amplifiers. At step 205, the amplified audio signals are used to drive separate vibrotactile devices 103 (e.g., voice coils).

FIG. 1 shows one embodiment of the form factor 105, in which vibrotactile devices 103 are arranged in a 2 by 8 array (104), embedded into a foam cushion 105 which can be used as a seating device.

Figure 3:
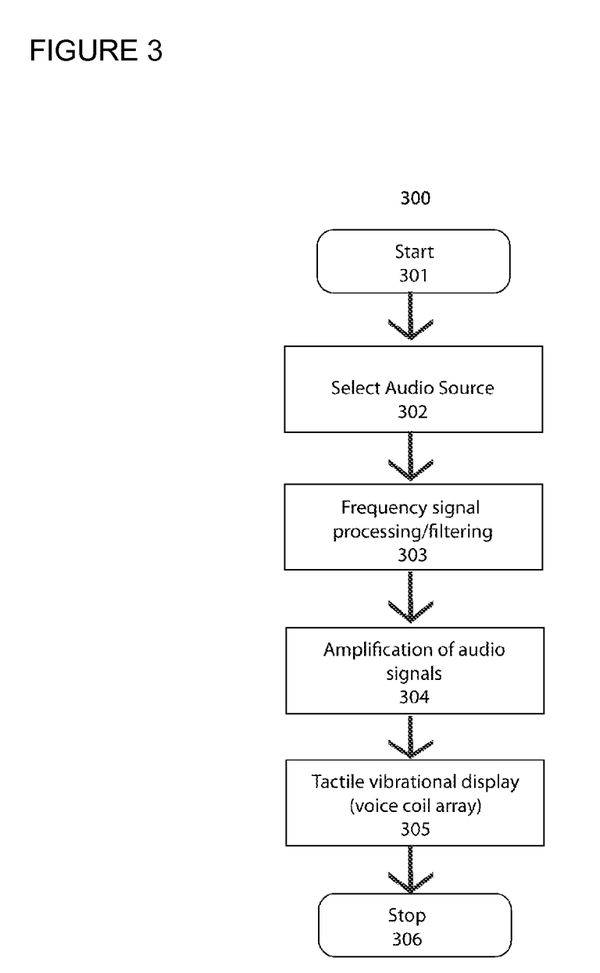
FIG. 3 is a flow chart for the processes required to perform the sensory substitution of an analog audio signal as vibration accordingly to an embodiment of the present matter.

FIG. 3 is a flowchart of operations detailing the embodiment of the MHC involving hardware manipulation of an analog audio source. At step 302 selection of an audio source 101 is made. At step 303, the frequency model is applied to separate the source into component analog signals using an analog audio filtering device 102. At step 304, the component analog signals are routed to separate amplifiers 108. At step 305, the amplified audio signals are used to drive separate vibrotactile devices, 103.

Figure 4:
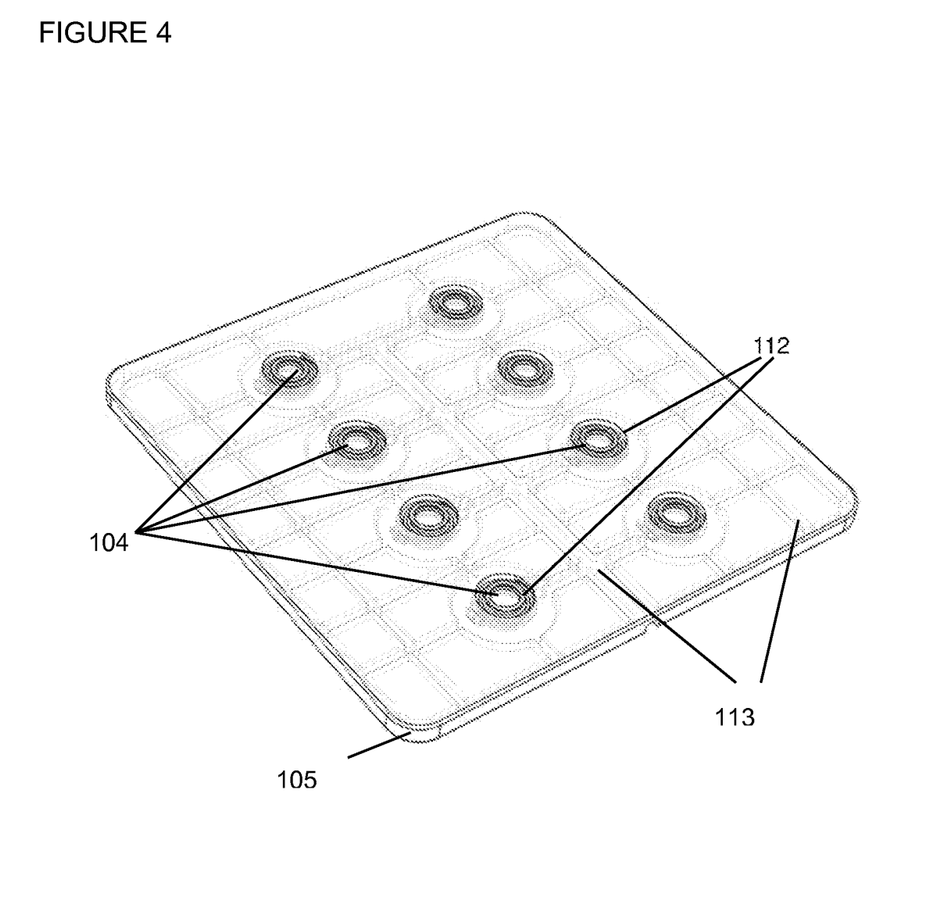
FIG. 4 is a representation of a housing for each of the vibrotactile devices in accordance with one embodiment.

FIG. 4 is an illustration of a plurality of housings 112 that respectively encase each of the voice coils 103 as a means of supporting an even distribution of the vibration signal across the surface of the form factor 105. A housing 112 can be molded out of rubber, latex, or other substance to snugly fit around a voice coil. Each voice coil 103 and its encasing housing 112 may be fit (e.g. embedded) into a respective position in the form factor 105 to define the array 104. Channels 113 may be configured to receive cables that link each of the voice coils 103. The channels 113 may serve to organize and protect or provide a guide from which to arrange the cables within the array (104) so that they fit neatly into the shape of the form factor 105. In one embodiment, each housing 112 and channel 113 can be inserted into the form factor 105. The channels 113 may be designed using either the same, or different material as is used in the housing. In an embodiment, the form factor may be configured to define channels for receiving cabling.

The above description can be illustrated by way of a simple concrete example. In the chair embodiment (100), voice coils are embedded within the padding of a chair back 105. Voice coils 103 are arranged vertically from top to the bottom in two parallel columns 104. Each voice coil 103 in a row along the column represents a single output channel that is mapped to a particular frequency band. In one embodiment, each voice coil may present a single output channel that is mapped to a particular frequency band (or track) thereby providing eight output channels. In another embodiment, two or more voice coils may be grouped and multiple groups may be defined with each group assigned a respective separate frequency band. For example, pairs of voice coils in the same row located on either side of the chair's center can be assigned the same frequency band to provide four output channels.

The rows are arranged so as to align with most effective perception of pitch by the associated location on the skin, relating to the number and type of mechanoreceptors that are common to different parts of the body. For example, in the current embodiment, highest frequencies are placed at the base of the seat, with lower signals being placed progressively higher on the back of the seat.

System 100 in this example can receive an audio signal 101 from analog input from a standard digital music (mp3) player. The signal 101 may be routed to the subsystem 102 using an appropriate coupler 110. The signal from 101 would then be manipulated into component frequency bands using a time-to-frequency transformation such as a fast-Fourier transformation. The output from each frequency band may be converted to an analog signal using a digital-to-analog audio interface 107 (e.g., external sound card). The analog signals may in turn be sent to a bank of amplifiers 108 that drive the voice coils 103 embedded in the chair form factor 105 in the array configuration 104.

The signal that is produced in each of the voice coils 103 represents the unique sound that is created for each channel when an audio signal 101 is processed into multiple frequency bands: in the lower range, the sound eminating from the voice coil would be low rhythmic tones of the drum section, while in the higher range, voice coils would emit sounds of a higher pitch, like that of the upper notes on a piano. The array of voice coils 104, when running synchronously, would produce a combined sound that matches that of the original audio source signal 101.

A user interface 109 that is either a software interface or hardware components such as knobs, dials, or sliders, which enable the user to control the audio signal to each of the voice coils 103 or the complete array of voice coils 104 for volume. User interface 109 also supports turning the system on or off, and in some embodiments, controlling the frequency signal sent to each voice coil 103.

It will be appreciated by those of ordinary skill in the art that the matter can be embodied in other specific forms without departing from the spirit of essential character thereon.
References:
 [1] J. G. Linvill and J. C. Bliss. A direct translation reading aid for the blind. Proceedings of the IEEE, 54:40-51, 1966.
 [2] display. In ICAT '05: Proceedings of the 2005 international conference on Augmented tele-existence, pages 251-252, New York, N.Y., USA, 2005. ACM Press.
 [3] J. B. Mitroo, N. Herman, and N. I. Badler. Movies from music: Visualizing musical compositions. In SIGGRAPH '79: Proceedings of the 6th annual conference on Computer graphics and interactive techniques, pages 218-225, New York, N.Y., USA, 1979. ACM Press.
 [4] Russo, F. A., & Pichora-Fuller, M. K. (2008). Tune-in or tune-out: Age-related differences in listening to speech in music. Ear and Hearing, 29, 746-760.
 [5] Pongrac, H. (2008). Vibrotactile perception: Examining the coding of vibrations and the just noticeable difference under various conditions. Multimedia Systems, 13(4), 297-307.

What is claimed is:

1. A method for presenting audio signals as tactile stimuli to a user comprising:
    receiving at least one source audio signal to be presented to the user; and
    in accordance with a sensory substitution model, outputting respective output signals comprising the entire range of frequencies of the at least one source audio signal for driving four or more output channels of a vibrotactile display wherein each output channel is presented via at least one vibrotactile device positioned to provide tactile stimuli directly or indirectly to cutaneous mechanoreceptors of the user's body to emulate stimulation of hair cells of the human cochlea such that perception of hearing experienced by a hearing person through the person's ear is emulated on the user's body.

2. The method of claim 1 wherein the sensory substitution model comprises a frequency model, wherein the at least one audio source signal, comprising a spectrum of frequencies, is separated into four or more distinct frequency bands to define output signals across the full spectrum of human hearing in order to emulate the perception of hearing through the ear on the user's body.

3. The method of claim 1 wherein the sensory substitution model comprises a track model and further wherein at least one audio source signal comprises four or more audio tracks separated in response to the respective tracks to define the output signals across the full spectrum of human hearing in order to emulate the perception of hearing through the ear on the user's body.

4. The method of claim 2 wherein the vibrotactile devices comprise four or more such devices arranged in a linear order in accordance with the sensory substitution model so as to align with perception of pitch by associated locations on the skin in order to emulate the perception of hearing through the user's body.

5. The method of claim 4 wherein the vibrotactile devices are positioned in a chair having a seat and a back and wherein output signals for the highest frequencies are directed to vibrotactile devices placed at the base of a seat and output signals for lower frequencies being directed to vibrotactile devices placed progressively higher on the back of the seat in order to emulate the perception of hearing through the ear on the user's body.

6. The method of claim 1 wherein the vibrotactile devices are positioned using a form factor comprising clothing or belts in order to emulate the perception of hearing as experienced through the ear on the user's body.

7. The method of claim 1 wherein any respective output channel is provided by one or more vibrotactile devices.

8. The method of claim 1 wherein the vibrotactile devices are responsive to amplitude and frequency components of the output signals in order to emulate the perception of hearing through the ear on the user's body.

9. The method of claim 1 wherein the vibrotactile devices are positioned in a respective housing to intensify and constrain a vibrational energy from the vibrotactile devices.

10. The method of claim 1 wherein at least some of the vibrotactile devices comprise voice coils for each of the four or more output channels, each channel outputting respective frequency bands of the at least one audio source signal such that the voice coils produce a combined sound that matches the audio source signal.

11. The method of claim 1 wherein the at least one audio signal comprises an analog or digital signal representing one or more of speech, music, soundtracks from either previously recorded or live sources.

12. The method of claim 1 comprising separating the at least one audio source signal in accordance with the sensory substitution model to define the output signals.

13. A computing device for presenting audio signals as tactile stimuli to a user, said device comprising a processor and memory coupled thereto, said memory storing instructions for configuring the processor to:
receive at least one source audio signal to be presented to the user; and
in accordance with a sensory substitution model, output respective output signals comprising the entire range of frequencies of the at least one source audio signal for driving four or more output channels of a vibrotactile display wherein each output channel is presented via at least one vibrotactile device positioned to provide tactile stimuli directly or indirectly to cutaneous mechanoreceptors of the user's body to emulate stimulation of hair cells of the human cochlea such that perception of hearing experienced by a hearing person through the person's ear is emulated on the user's body.

14. The computing device of claim 13 wherein the processor is configured to separate the at least one audio source signal in accordance with the sensory substitution model to define the output signals.

15. The computing device of claim 14 wherein the sensory substitution model comprises a frequency model, wherein the at least one audio source signal, comprising a spectrum of frequencies, is separated into four or more distinct frequency bands to define output signals across the full spectrum of human hearing in order to emulate the perception of hearing through the ear on the user's body.

16. The computing device of claim 14 wherein the sensory substitution model comprises a track model and further wherein at least one audio source signal comprises four or more audio tracks separated in response to the respective tracts to define the output signals across the full spectrum of human hearing in order to emulate the perception of hearing through the ear on the user's body.

17. A computer program product comprising a computer memory storing computer readable instructions for presenting audio signals as tactile stimuli to a user, which instructions when executed by a computer processor configure the processor to:
receive at least one source audio signal to be presented to the user; and
in accordance with a sensory substitution model, output respective output signals comprising the entire range of frequencies of the at least one source audio signal for driving four or more output channels of a vibrotactile display wherein each output channel is presented via at least one vibrotactile device positioned to provide tactile stimuli directly or indirectly to cutaneous mechanoreceptors of the user's body to emulate stimulation of hair cells of the human cochlea such that perception of hearing experienced by a hearing person through the person's ear is emulated on the user's body.

18. A system for presenting audio signals as tactile stimuli to a user comprising:
a signal processing sub-system having an output for output signals to drive four or more output channels in accordance with a sensory substitution model, said output signals comprising the entire range of frequencies of at least one source audio signal to be presented to the user; and
a vibrotactile display configured to receive the output signals and comprising the four or more output channels, wherein each output channel is presented via at least one vibrotactile device, each vibrotactile device configured for positioning to provide tactile stimuli directly or indirectly to cutaneous mechanoreceptors of the user's body to emulate stimulation of hair cells of the human cochlea such that perception of hearing experienced by a hearing person through the person's ear is emulated on the user's body.

19. The system of claim 18 wherein the sensory substitution model comprises a frequency model, wherein the at least one audio source signal, comprising a spectrum of frequencies, is separated into four or more distinct frequency bands to define to output signals across the full spectrum of human hearing in order to emulate the perception of hearing through the ear on the user's body.

20. The system of claim 18 wherein the sensory substitution model comprises a track model and further wherein the at least one audio source signal comprises four or more audio tracks separated in response to the respective tracts to define the output signals across the full spectrum of human hearing in order to emulate the perception of hearing through the ear on the user's body.

21. The system of claim 18 comprising an audio interface for receiving at least one source audio signal to be presented to the user.

22. The system of claim 18 comprising a computing device for processing the at least one source audio signal.

23. The system of claim 18 wherein the signal processing sub-system comprises a plurality band-pass filters.

24. The system of claim 19 wherein the vibrotactile devices are positioned in a chair having a seat and a back and wherein output signals for the highest frequencies are directed to vibrotactile devices placed at the base of a seat and output signals for lower frequencies being directed to vibrotactile devices placed progressively higher on the back of the seat in order to emulate the perception of hearing through the ear on the user's body.

25. The system of claim 19 wherein the vibrotactile devices comprise four or more such devices arranged in a linear order in accordance with the sensory substitution model so as to align with perception of pitch by associated locations on the skin in order to emulate the perception of hearing through the user's body.

26. The system of claim 18 wherein the vibrotactile devices of the vibrotactile display are positioned using a form factor comprising clothing or belts in order to emulate the perception of hearing as experienced through the ear on the user's body.

27. The system of claim 18 wherein any respective output channel is provided by one or more vibrotactile devices.

28. The system of claim 18 wherein the vibrotactile devices are positioned in a respective housing to intensify and constrain a vibrational energy from the vibrotactile devices.

29. The system of claim 18 wherein the vibrotactile devices are responsive to amplitude and frequency components of the output signals.

30. The system of claim 18 wherein at least some of the vibrotactile devices comprise voice coils for each of the four or more output channels, each channel outputting respective frequency bands of the at least one audio source signal such that the voice coils produce a combined sound that matches the audio source signal.

* * * * *